United States Patent [19]

Cantatore

[11] Patent Number: 4,459,395

[45] Date of Patent: Jul. 10, 1984

[54] PIPERIDYL DERIVATIVES OF TRIAZINE COPOLYMERS, PROCESSES FOR THEIR PREPARATION AND STABILIZED COMPOSITION CONTAINING THESE DERIVATIVES

[75] Inventor: Giuseppe Cantatore, Casalecchio di Reno, Italy

[73] Assignee: Chimosa Chimica Organica S.p.A., Bologna, Italy

[21] Appl. No.: 475,114

[22] Filed: Mar. 14, 1983

Related U.S. Application Data

[63] Continuation of Ser. No. 286,758, Jul. 27, 1981, abandoned.

[30] Foreign Application Priority Data

Jul. 31, 1980 [IT] Italy ................................ 23832 A/80

[51] Int. Cl.$^3$ .................... C07D 251/70; C08G 73/08; C08K 5/34
[52] U.S. Cl. .................................. 524/100; 528/423; 544/198; 544/209; 544/212
[58] Field of Search ................. 524/100; 544/198, 209, 544/212; 528/423

[56] References Cited

U.S. PATENT DOCUMENTS 4,086,204   4/1978   Cassandrini et al. .
4,108,928   8/1978   Cassandrini et al. .
4,233,412  11/1980   Rody .
4,315,859   2/1982   Nikles .................................. 544/198

FOREIGN PATENT DOCUMENTS 1089461  11/1980  Canada .

OTHER PUBLICATIONS

English Language Version of Case 3-12185/S/+ corresponding to E.P. 13 665.

*Primary Examiner*—V. P. Hoke

*Attorney, Agent, or Firm*—Wenderoth, Lind & Ponack

[57] ABSTRACT

The invention relates to a novel piperidine compounds which act as light stabilizers, heat stabilizers and oxidation stabilizers for synthetic polymers and have the general formula

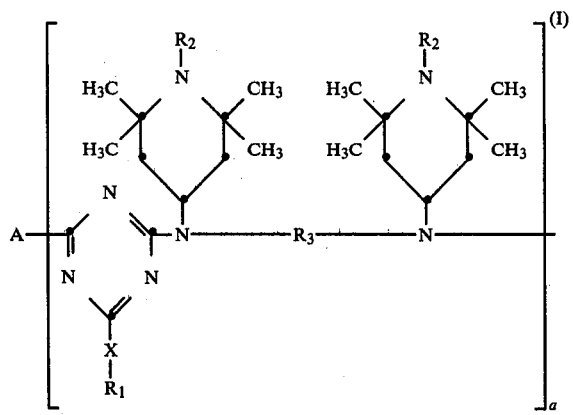

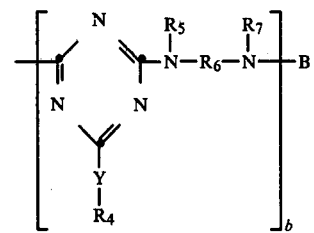

in which $R_1$, $R_2$, $R_3$, $R_4$, $R_5$, $R_6$, $R_7$, A, B, X, Y, a and b are as defined in the specification.

The compounds are particularly useful as light stabilizers for polyolefines in the form of fibres or film.

8 Claims, No Drawings

PIPERIDYL DERIVATIVES OF TRIAZINE COPOLYMERS, PROCESSES FOR THEIR PREPARATION AND STABILIZED COMPOSITION CONTAINING THESE DERIVATIVES

This application is a continuation of application Ser. No. 286,758, filed July 27, 1981 (now abandoned).

Piperidyl derivatives of triazine copolymers, having good efficiency as light stabilisers for synthetic polymers, are already known. In particular the U.S. Pat. No. 4,086,204 of the applicant, describes triazine polymers of general formula

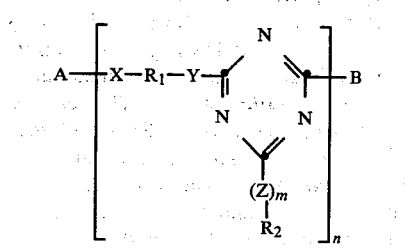

where X, Y can also be radicals of formula

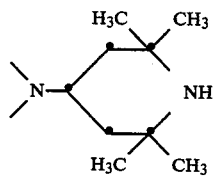

The preparation of said products presents different drawbacks because in many cases, besides the expected products, there is the formation of considerable quantities of by-products, insoluble in the reaction mixture, which considerably lower the yield and cause difficulties in the separation and purification of the final product.

With great surprise the applicant has now found that with the use of particular reactants mixtures, the above drawbacks are totally avoided and that the yield of final product is considerably higher. This means a remarkable economic advantage because it results in an increase in the yield of the light stabilising polytriazine compound combined with a significant simplification of manufacturing process in avoiding separation and subsequent disposal of by-products; furthermore there is a lower consumption of solvent that, in the presence of by-products, is partially taken up by the same and hence is difficultly recovered.

The present invention relates to piperidyl derivatives of triazine copolymers, which can be used as light stabilisers, heat stabilisers and oxidation stabilisers for synthetic polymers, and to the process for their preparation.

More precisely, the present invention relates to piperidyl derivatives of triazine copolymers of the general formula (I)

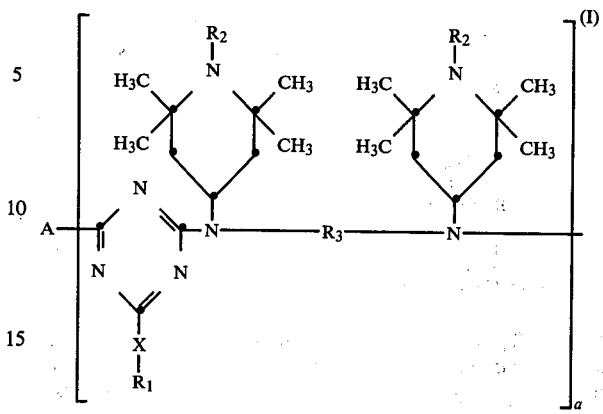

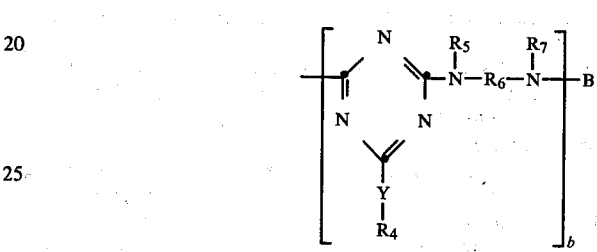

in which $R_1$ and $R_4$, which may be identical or different, are hydrogen, $C_1$–$C_{20}$-alkyl, $C_3$–$C_{20}$-alkenyl, $C_5$–$C_{20}$-cycloalkyl, $C_6$–$C_{20}$-aryl, $C_7$–$C_{20}$-aralkyl or a radical of the formula (II)

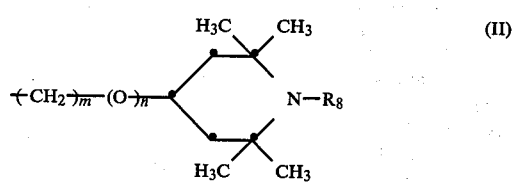

in which m is zero, 1, 2 or 3 and n is zero or 1, $R_8$ is hydrogen, $C_1$–$C_{12}$-alkyl, $C_3$–$C_{12}$-alkenyl or -alkynyl, substituted or unsubstituted $C_7$–$C_{12}$-benzyl or aliphatic $C_1$–$C_6$-acyl; X and Y, which may be identical or different, are >O or >N—$R_9$, in which $R_9$ is hydrogen, $C_1$–$C_{20}$-alkyl, $C_5$–$C_{20}$-cycloalkyl or a radical of the formula (II); $R_2$ has the same meaning as $R_8$; $R_3$ and $R_6$, which may be identical or different, are $C_2$–$C_{12}$-alkylene, $C_5$–$C_{12}$-cycloalkylene, $C_6$–$C_{12}$-arylene, $C_7$–$C_{12}$-aralkylene or a radical of the formula (III)

in which $R_{10}$, $R_{11}$ and $R_{12}$, which may be identical or different, are $C_2$–$C_6$-alkylene and $Z_1$ and $Z_2$, which may be identical or different, are >O or >N—$R_9$, in which $R_9$ has the abovementioned meaning, and r is zero, 1 or 2; $R_5$ and $R_7$, which may be identical or different, are hydrogen, $C_1$–$C_{12}$-alkyl, $C_5$–$C_{12}$-cycloalkyl or, together with $R_6$, form part of a 6- or 7-membered heterocyclic ring containing two nitrogen atoms; A is an end group and is chlorine or a radical of the formula (IV) or (V)

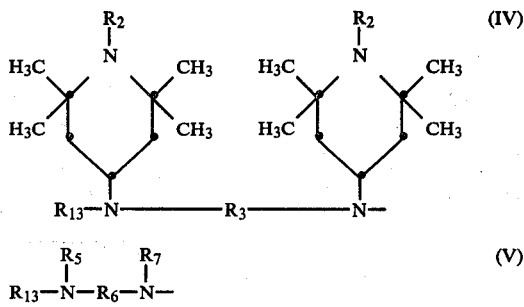

(IV)

$$R_{13}-N-R_6-N-$$
(V)

B and $R_{13}$ being hydrogen, methyl, allyl, benzyl or acetyl; and the ratio a:b varies from 3:1 to 1:3 and the number-average molecular weight $\overline{M}n$ is between 1 500 and 20 000.

Examples which illustrate the meanings of the various symbols in the formula (I) are:

$R_1$ and $R_4$: hydrogen, methyl, ethyl, n-propyl, isopropyl, n-butyl, 2-butyl, isobutyl, n-hexyl, n-octyl, 2-ethylhexyl, n-dodecyl, n-hexadecyl, n-octadecyl, allyl, methallyl, but-2-enyl, hex-2-enyl, undec-10-enyl, oleyl, cyclohexyl, 3,3,5-trimethylcyclohexyl, phenyl, 2-, 3- and 4-methylphenyl, 4-methoxyphenyl, 4-ethoxyphenyl, 3,5-di-t-butyl-4-hydroxyphenyl, benzyl, 4-methylbenzyl, 4-t-butylbenzyl, 4-hydroxybenzyl, 3,5-di-t-butyl-4-hydroxybenzyl, 2,2,6,6-tetramethyl-piperid-4-yl, 1,2,2,6,6-pentamethyl-piperid-4-yl, 1-allyl-2,2,6,6-tetramethylpiperid-4-yl, 1-benzyl-2,2,6,6-tetramethyl-piperid-4-yl, 1-acetyl-2,2-6,6-tetramethyl-piperid-4-yl, 2-(2,2,6,6-tetramethyl-piperid-4-yl)-ethyl and 3-(2,2,6,6-tetramethyl-piperid-4-yloxy)-propyl.

$R_2$ and $R_8$: hydrogen, methyl, ethyl, n-propyl, n-butyl, n-hexyl, n-octyl, allyl, methallyl, but-2-enyl, hex-2-enyl, propargyl, benzyl, 4-methylbenzyl, 4-t-butylbenzyl, 4-hydroxybenzyl, acetyl, propionyl, butyryl and caproyl.

$R_3$ and $R_6$: ethylene, 1,2-propylene, trimethylene, 2-hydroxyl-1,3-propylene, tetramethylene, pentamethylene, 2,2-dimethyl-1,3-propylene, hexamethylene, 2,2,4- and 2,4,4-trimethylhexamethylene, octamethylene, decamethylene, dodecamethylene, 1,2-, 1,3- and 1,4-cyclohexylene, 1,3- and 1,4-cyclohexylenedimethylene, o-, m- and p-phenylene and o-, m- and p-xylylene.

$R_5$ and $R_7$: Hydrogen, methyl, ethyl, n-propyl, isopropyl, n-butyl, 2-butyl, isobutyl, n-hexyl, n-octyl, 2-ethylhexyl, n-dodecyl, cyclohexyl and 3,3,5-trimethylcyclohexyl; examples which illustrate $R_5$ and $R_7$ when they form part of a heterocyclic ring together with $R_6$ are piperazine-1,4-diyl, 2,5-dimethyl-piperazine-1,4-diyl and homopiperazine-1,4-diyl.

$R_9$: hydrogen, methyl, ethyl, n-propyl, isopropyl, n-butyl, 2-butyl, isobutyl, n-hexyl, n-octyl, 2-ethylhexyl, n-dodecyl, cyclohexyl, 3,3,5-trimethylcyclohexyl, 2,2,6,6-tetramethyl-piperid-4-yl, 1,2,2,6,6-pentamethyl-piperid-4-yl, 1-allyl-2,2,6,6-tetramethyl-piperid-4-yl, 1-benzyl-2,2,6,6-tetramethyl-piperid-4-yl, 2-(2,2,6,6-tetramethylpiperid-4-yl)-ethyl and 3-(2,2,6,6-tetramethyl-piperid-4-yloxy)-propyl.

$R_{10}$, $R_{11}$ and $R_{12}$: ethylene, 1,2-propylene, trimethylene, tetramethylene and hexamethylene.

Preferred compounds of the formula (1) are those in which $R_1$ and $R_4$, which may be identical or different, are hydrogen, $C_1$–$C_{12}$-alkyl, $C_6$–$C_{10}$-cycloalkyl, 2,2,6,6-tetramethyl-piperid-4-yl, 1,2,2,6,6-pentamethyl-piperid-4-yl, 1-allyl-2,2,6,6-tetramethyl-piperid-4-yl, 1-benzyl-2,2,6,6-tetramethyl-piperid-4-yl or 1-acetyl-2,2,6,6-tetramethyl-piperid-4-yl, $R_2$ is hydrogen, methyl, allyl, benzyl or acetyl, $R_3$ and $R_6$, which may be identical or different, are $C_2$–$C_6$-alkylene, $C_8$–$C_{10}$-cycloalkylene or $C_8$–$C_{10}$-aralkylene, $R_5$ and $R_7$, which may be identical or different, are hydrogen, $C_1$–$C_6$-alkyl or $C_6$–$C_{10}$-cycloalkyl or $R_5$ and $R_7$, together with $R_6$, are a piperazine-1,4-diyl radical, $R_{13}$ is hydrogen or methyl, X and Y, which may be identical or different, are $>$N—$R_9$, $R_9$ is hydrogen, $C_1$–$C_{12}$-alkyl or $C_6$–$C_{10}$-cycloalkyl and a and b are in the ratio of from 2:1 to 1:2 and the number average molecular weight $\overline{M}n$ is between 1 500 and 20 000.

Particularly preferred compounds of the formula (I) are those in which $R_1$ and $R_4$, which may be identical or different, are 2,2,6,6-tetramethyl-piperid-4-yl and 1,2,2,6,6-pentamethyl-piperid-4-yl, X and Y, which may be identical or different, are $>$N—$R_9$ in which $R_9$ is hydrogen or $C_1$–$C_8$-alkyl, $R_2$ is hydrogen or methyl, $R_{13}$ is hydrogen, $R_3$ and $R_6$, which may be identical or different, are $C_2$–$C_6$-alkylene, 1,3-cyclohexylenedimethylene or m-xylylene, $R_5$ and $R_7$, which may be identical or different, are hydrogen, n-butyl and cyclohexyl or, together with $R_6$, form a piperazine ring, a and b are in the ratio of 1:1 and the number average molecular weight $\overline{M}n$ is between 2 000 and 10 000.

The novel compounds of the present invention can be prepared by copolymerizing dichlorotriazines of the formula (VI) and (VII)

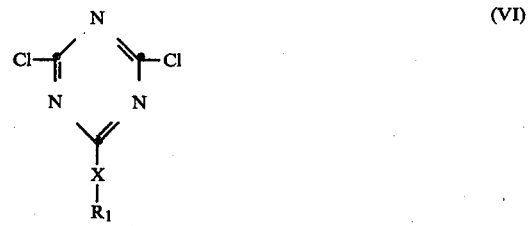

(VI)

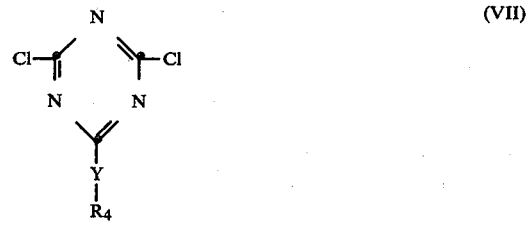

(VII)

with diamines of the formula (VIII) and (IX)

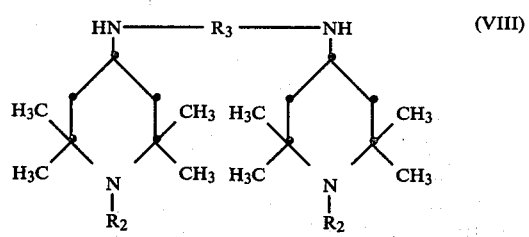

(VIII)

(IX)

in the presence of an inert solvent, preferably toluene, xylene or ethylbenzene, and of an organic or inorganic base, preferably sodium hydroxide or potassium hydroxide, the molar ratio (VI):(VII) and (VIII):(IX) being between 3:1 and 1:3, preferably between 2:1 and 1:2, at a temperature of between 40° and 200° C., preferably between 60° and 180° C.

The two reagents (VIII) and (IX) can be reacted with the dichlorotriazines (VI) and (VII) simultaneously or separately, the molar ratio (VI+VII):(VIII+IX) being between 1.2:1 and 1:1.5, preferably between 1:1 and 1:1.2. If the ratio a:b is 1:1 and $R_1$—X—=$R_4$—Y—, it is possible to prepare copolymers of the formula (I), with regular alternation of the two radicals (X) and (XI)

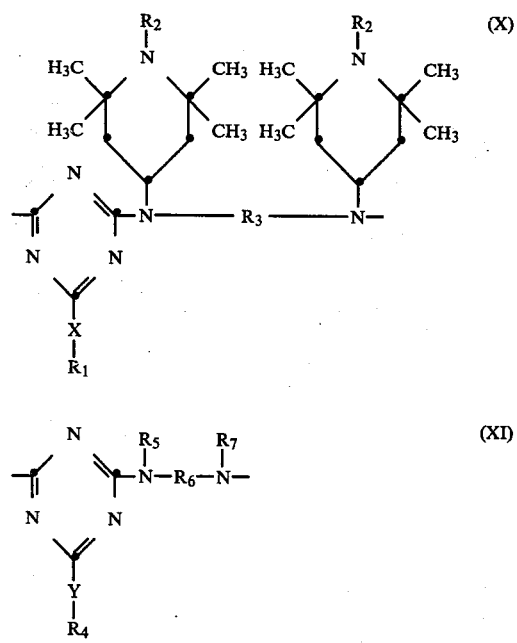

by first reacting, with the dichlorotriazine, one of the two reactants (VIII) or (IX) at a temperature of between 40° and 100° C., preferably 60°–80° C., in the molar ratio of 1:2, so as to form, as an intermediate, the compound (XII)

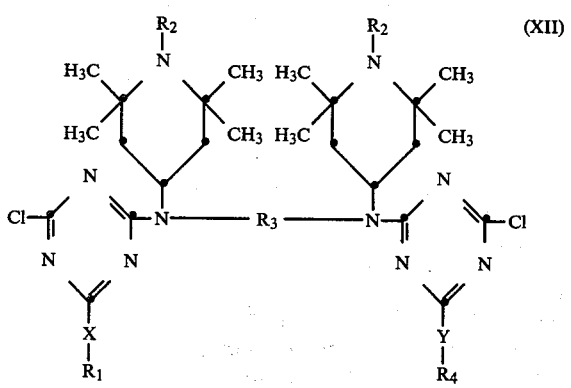

or

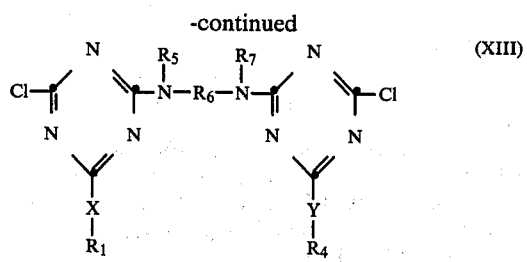

and thereafter completing the reaction with the second reagent at a temperature of between 100° and 200° C., preferably between 120° and 180° C.

The compounds of the formula (VIII) are obtained by reductive alkylation in the presence of hydrogen and of a hydrogenation catalyst, of alkylene-diamines of the formula

$$H_2N—R_3—NH_2$$

with a tetramethyl-4-piperidone of the formula

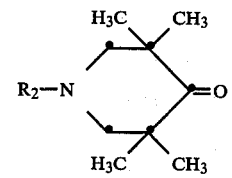

as described in U.S. Pat. No. 3,480,635.

As mentioned at the outset, the compounds of the formula (I) are very efficient in improving the light resistance, heat resistance and oxidation resistance of synthetic polymers, for example polyolefins as high-density and low-density polyethylene, polypropylene, ethylene/propylene copolymers of ethylene/vinyl acetate copolymers, polybutadiene, polyisoprene, polystyrene, butadiene/styrene copolymers, acrylonitrile/-butadiene/styrene copolymers, polymers and copolymers of vinyl chloride and of vinylidene chloride, polyoxymethylene, polyurethanes, saturated and unsaturated polyesters, polyamides, polycarbonates, polyacrylates, alkyd resins and epoxide resins.

The compounds of the formula (I) can be employed as a mixture with the synthetic polymers in various ratios which depend on the nature of the polymer, the final use and the presence of other additives. In general, it is appropriate to employ from 0.01 to 5% by weight of the compounds of the formula (I) relative to the weight of the polymers, preferably from 0.05 to 1%.

The compounds of the formula (I) can be incorporated into the polymeric materials by various processes, such as dry mixing in the form of a powder, or wet mixing in the form of a solution or suspension, and also in the form of a masterbatch; in these operations, the synthetic polymer can be employed in the form of a powder, granules, a solution, a suspension or an emulsion. The polymers stabilised with the products of the formula (I) can be employed for the preparation of moulded articles, film, tapes, fibres, monofilaments, lacquers and the like.

If desired, other additives may be added to the mixtures of the compounds of the formula (I) with the synthetic polymers, examples being antioxidants, UV absorbers, nickel stabilisers, pigments, fillers, plasticisers, antistatic agents, flameproofing agents, lubricants, corrosion inhibitors and metal deactivators.

Examples of the additives which can be employed in a mixture with the compounds of the formula (I) are, in particular:

phenolic antioxidants, such as, for example, 2,6-di-t-butyl-p-cresol, 4,4′-thio-bis-(3-methyl-6-t-butylphenol), 1,1,3-tris-(2-methyl-4-hydroxy-5-t-butylphenyl)-butane, octadecyl 3-(3,5-di-t-butyl-4-hydroxyphenyl)-propionate, pentaerythritol tetrakis-3-(3,5-di-t-butyl-4-hydroxyphenyl)-propionate, tris-(3,5-di-t-butyl-4-hydroxybenzyl) isocyanurate and tris-(4-t-butyl-3-hydroxy-2,6-dimethyl-benzyl)-isocyanurate;

secondary antioxidants, such as: esters of thiodipropionic acid, for example di-n-dodecyl thiodipropionate and di-n-octadecyl thiodipropionate; aliphatic sulfides and disulfides, for example di-n-dodecyl sulfide, di-n-octadecyl sulfide and di-n-octadecyl disulfide; aliphatic, aromatic and aliphatic-aromatic phosphites and thiophosphites, for example tri-n-dodecyl phosphite, tris-(nonylphenyl) phosphite, tri-n-dodecyl trithiophosphite, phenyl di-n-decyl phosphite, di-n-octadecyl pentaerythritol diphosphite, tris-(2,4-di-t-butylphenyl) phosphite and tetrakis-(2,4-di-t-butylphenyl) 4,4′-biphenylene-diphosphonite;

UV absorbers, for example 2-hydroxy-4-n-octyloxybenzophenone, 2-hydroxy-4-n-dodecyloxybenzophenone, 2-(2-hydroxy-3,5-di-t-butylphenyl)-5-chlorobenzotriazole, 2-(2-hydroxy-3,5-di-t-amylphenyl)-benzotriazole, 2,4-di-t-butylphenyl 3,5-di-t-butyl-4-hydroxybenzoate, hexadecyl 3,5-di-t-butyl-4-hydroxybenzoate, phenyl salicylate, p-t-butylphenyl salicylate, 2-ethoxy-2′-ethyl-oxanilide, 2-ethoxy-5-t-butyl-2′-ethyl-oxanilide and 2-ethoxy-2′-ethyl-5,5′-di-t-butyloxanilide;

piperidine-type light stabilisers, for example 2,2,6,6-tetramethyl-piperid-4-yl benzoate, bis-(B 2,2,6,6-tetramethyl-piperid-4-yl) sebacate, bis-(1,2,2,6,6-pentamethyl-piperid-4-yl) sebacate and bis-(1,2,2,6,6-pentamethyl-piperid-4-yl) butyl-3,5-di-t-butyl-4-hydroxybenzylmalonate;

nickel-based light stabilisers, for example Ni monoethyl 3,5-di-t-butyl-4-hydroxybenzyl-phosphonate, the butylamine-Ni 2,2′-thio-bis-(4-t-octylphenolate) complex, Ni 2,2′-thio-bis-(4-t-octylphenolphenolate), Ni dibutyl-dithiocarbamate, Ni 3,5-di-t-butyl-4-hydroxybenzoate and the Ni complex of 2-hydroxy-4-n-octyloxybenzophenone;

organo-tin stabilisers, for example dibutyl-tin maleate, dibutyl-tin laurate and dioctyl-tin maleate;

acrylic esters, for example ethyl α-cyano-β,β-diphenyl-acrylate and methyl α-cyano-β-methyl-4-methoxycinnamate.

metal salts of higher fatty acids, for example the stearates of calcium, barium, cadmium, zinc, lead and nickel and the laurates of calcium, cadmium zinc and barium;

organic and inorganic pigments, for example Colour Index Pigment Yellow 37, Colour Index Pigment Yellow 83, Colour Index Pigment Red 144, Colour Index Pigment Red 48:3, Colour Index Pigment Blue 15, Colour Index Pigment Green 7, titanium dioxide, iron oxide and the like.

Due to their low volatility and migration tendency, the compounds of the present invention are particularly useful as light stabilisers for polyolefin thin articles such as fibres, tapes and films for which it is possible, during the manufacturing and use, to have a more or less quick loss of stabilisers due to evaporation, blooming or extraction by water, especially in the presence of surfactants.

For better illustration of the present invention, some examples of the preparation of the compounds of the formula (I) will now be described; these examples are given purely by way of illustration and do not imply any limitation.

EXAMPLE 1

A copolymer having the recurring unit (XIV)

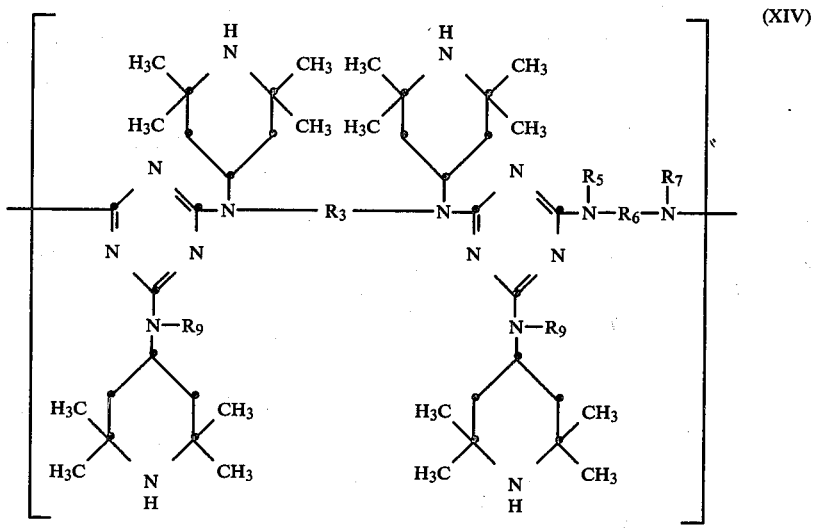

(XIV)

in which $R_3 = \!\!+\!\!(CH_2)_6$, $R_5$ and $R_7 = H-$, $R_6 = \!\!+\!\!(CH_2)_3$ and $R_9 = n-C_4H_9$ is prepared in the following manner: 72 g (0.2 mol) of 2,4-dichloro-6-[N-(2,2,6,6-tetramethyl-piperid-4-yl)-butylamino]-1,3,5-triazine, 39.4 g (0.1 mol) of N,N′-bis-(2,2,6,6-tetramethyl-piperid-4-yl)-hexamethylenediamine, 32 g of sodium hydroxide and 200 ml of xylene are heated for 2 hours at 70° C. 8.9 g (0.12 mol) of trimethylenediamine are then added and the mixture is heated under reflux for 16 hours. After removing the inorganic products and evaporating the solvent, 102.5 g (97% of theory) of a light yellow resinous product are obtained, having a number-average molecular weight $\overline{M}n$ of 2 850 and a melting point of 123°-7° C.

EXAMPLES 2-8

Following the procedure described in Example 1, and using the same ratios of the reagents, other triazine copolymers of the formula (XIV) are prepared.

Table I shows the various substituents and the properties of the products obtained.

EXAMPLE 16

83 g (0.25 mol) of 2,4-dichloro-6-[N-(2,2,6,6-tetramethylpiperid-4-yl)-ethylamino]-1,3,5-triazine, 78.8 g (0.2 mol) of N,N'-bis-(2,2,6,6-tetramethyl-piperid-4-yl)-hexamethylenediamine, 8.7 g 0.075 mol) of hexamethylenediamine, 40 g of sodium hydroxide and 250 ml of xylene are heated for 2 hours at 70° C. and for 16 hours under reflux.

After removing the inorganic products and evaporating the solvent, 147 g (96.5% of theory) of a light yellow resinous product are obtained, having a number-average molecular weight $\overline{Mn}$ of 3 560 and a melting point of 117°-22° C.

TABLE I

| Example | $R_3$ | $R_5$ | $R_6$ | $R_7$ | $R_9$ | $\overline{Mn}$ | m.p. |
|---|---|---|---|---|---|---|---|
| 2 | —(CH₂)₆— | H— | —(CH₂)₆— | H— | n-C₄H₉— | 2360 | 122–128° C. |
| 3 | —(CH₂)₆— | | —N⌒N— (piperazine) | | n-C₄H₉— | 3180 | 295–305° C. |
| 4 | —(CH₂)₆— | n-C₄H₉— | —(CH₂)₃— | n-C₄H₉— | C₂H₅— | 3040 | 121–127° C. |
| 5 | —(CH₂)₆— | H— | —(CH₂)₂—NH(CH₂)₂— | H— | n-C₄H₉— | 3180 | 133–141° C. |
| 6 | —(CH₂)₃— | H— | —(CH₂)₆— | H— | n-C₄H₉— | 2700 | 139–147° C. |
| 7 | —(CH₂)₃— | (cyclohexylene) | —(CH₂)₂— | (cyclohexylene) | C₂H₅— | 2330 | 201–208° C. |
| 8 | —(CH₂)₂— | H— | —(CH₂)₆— | H— | n-C₄H₉— | 3400 | 143–149° C. |

EXAMPLE 9

83.2 g (0.2 mol) of 2,4-dichloro-6-[N-(2,2,6,6-tetramethyl-piperid-4-yl)-octylamino]-1,3,5-triazine, 33.8 g (0.1 mol) of N,N'-bis-(2,2,6,6-tetramethyl-piperid-4-yl)-ethylenediamine, 32 g of sodium hydroxide and 200 ml of xylene are heated for 2 hours at 70° C. 12.8 g (0.11 mol) of hexamethylenediamine are added and the mixture is heated under reflux for 16 hours. After removing the inorganic products and evaporating the solvent, 110 g (95.5% of theory) of a light yellow resinous product are obtained, having a number-average molecular weight $\overline{Mn}$ of 3 960 and a melting point of 129°-35° C.

EXAMPLES 10-15

Following the procedure described in Example 9, and using the same ratios of the reagents, other triazine copolymers of the formula (XIV) are prepared.

Table II shows the various substituents and the properties of the products obtained.

EXAMPLE 17

The copolymer of Example 1, methylated on the NH groups, is prepared in the following manner: 50 g of the copolymer prepared according to Example 1, 28 g of 88% formic acid, 41 g of 37% formaldehyde and 50 ml of water are heated under reflux for 12 hours.

After cooling, the reaction mixture is diluted with 200 ml of water and a solution of 30 g of sodium hydroxide in 500 ml of water is added. The precipitate obtained is filtered off, washed with water until the latter has a neutral pH, and dried.

TABLE II

| Example | $R_3$ | $R_5$ | $R_6$ | $R_7$ | $R_9$ | $\overline{Mn}$ | m.p. |
|---|---|---|---|---|---|---|---|
| 10 | —(CH₂)₂— | (cyclohexylene) | —(CH₂)₃— | H— | C₂H₅— | 3550 | 120–125° C. |
| 11 | —(CH₂)₃— | H— | —(CH₂)₃— | H— | n-C₄H₉— | 3330 | 168–179° C. |
| 12 | —(CH₂)₃— | H— | —CH₂—(phenylene)—CH₂— | H— | C₂H₅— | 3740 | 163–171° C. |
| 13 | —(CH₂)₃— | H— | —CH₂—(phenylene)—CH₂— | H— | n-C₄H₉— | 3960 | 160–168° C. |
| 14 | —(CH₂)₆— | H— | —(CH₂)₆— | H— | H— | 3190 | 109–116° C. |
| 15 | —(CH₂)₂—NH(CH₂)₂— | H— | —(CH₂)₆— | H— | n-C₄H₉— | 3960 | 113–121° C. |

54 g of a light-coloured product melting at 178°–183° C. and having a number-average molecular weight $\overline{M}n$ of 2 970 are obtained.

EXAMPLE 18

55.3 g (0.25 mol) of 2,4-dichloro-6-sec-butylamino-1,3,5-triazine, 63.5 g (0.188 mol) of N,N'-bis-(2,2,6,6-tetramethyl-piperid-4-yl)-ethylenediamine, 8.7 g (0.075 mol) of hexamethylenediamine, 40 g of sodium hydroxide and 200 ml of xylene are heated for 2 hours at 70° C. and for 16 hours under reflux.

After removing the inorganic products and evaporating the solvent, 107 g (98% of theory) of light yellow resinous product are obtained, having a number average molecular weight $\overline{M}n$ of 3 440 and a melting point of 132°–41° C.

EXAMPLE 19

66.4 g (0.2 mol) of 2,4-dichloro-6-[N-(2,2,6,6-tetramethyl-piperid-4-yl)ethylamino]-1,3,5-triazine, 39.4 g (0.1 mol) of N,N'-bis(2,2,6,6-tetramethyl-piperid-4-yl)hexamethylenediamine, 8.4 g of sodium hydroxide and 200 ml of xylene are heated for 4 hours at 60° C. 12.8 g (0.11 mol) of hexamethylenediamine and 16 g of sodium hydroxide are then added and the mixture is refluxed for 16 hours.

After removing the inorganic products and evaporating the solvent, 102 g (98% of the theory) of a light yellow resinous product are obtained, having a number average molecular weight $\overline{M}n$ of 3510 and a melting point of 149°–54° C.

EXAMPLE 20

138.5 g (0.5 mol) of 2,4-dichloro-6-(1,1,3,3-tetramethylbutylamino)-1,3,5-triazine, 98.5 g (0.25 mol) of N,N'-bis(2,2,6,6-tetramethyl-piperid-4-yl)hexamethylenediamine, 21 g of sodium hydroxide and 400 ml of xylene are heated for 4 hours at 60° C. 34.8 g (0.3 mol) of hexamethylenediamine and 40 g of sodium hydroxide are then added and the mixture is refluxed for 16 hours.

After removing the inorganic products and evaporating the solvent, 228.3 g (97% of theory) of a light yellow resinous product are obtained, having a number average molecular weight $\overline{M}n$ of 2920 and a melting point of 115°–21° C.

EXAMPLE 21

126 g (0.35 mol) of 2,4-dichloro-6-[N-(2,2,6,6-tetramethylpiperid-4-yl)-n-butylamino]-1,3,5-triazine, 33.3 g (0.15 mol) of 2,4-dichloro-6-n-butoxy-1,3,5-triazine, 98.5 g (0.25 mol) of N,N'-bis-(2,2,6,6-tetramethyl-piperid-4-yl)-hexamethylenediamine, 34.8 g (0.3 mol) of hexamethylenediamine, 60 g of sodium hydroxide and 250 ml of xylene are heated for 2 hours at 70° C. and for 16 hours under reflux.

After removing the inorganic products and evaporating the solvent, 246 g (96% of theory) of a light yellow resinous product are obtained, having a number average molecular weight $\overline{M}n$ of 2750 and a melting point of 186°–91° C.

EXAMPLE 22

44.4 g (0.2 mol) of 2,4-dichloro-6-n-butoxy-1,3,5-triazine, 39.4 g (0.1 mol) of N,N'-bis(2,2,6,6-tetramethyl-piperid-4-yl)hexamethylenediamine, 8.4 g of sodium hydroxide and 200 ml of xylene are heated for 4 hours at 60° C. 12.8 g (0.11 mol) of hexamethylenediamine and 16 g of sodium hydroxide are then added and the mixture is refluxed for 16 hours. After removing the inorganic products and evaporating the solvent, 80.2 g (97.8% of theory) of a light yellow resinous product are obtained, having a number average molecular weight $\overline{M}n$ of 4060 and a melting point of 119°–25° C.

EXAMPLE 23

As comparison, following the procedure described in Example 1, the compound of Example 1 of U.S. Pat. No. 4,086,204 is prepared, starting from 0.1 mol of 2,4-dichloro-6-n-butylamino-1,3,5/-triazine and 0.11 mol of N,N'-bis(2,2,6,6-tetramethyl-piperid-4-yl)-hexamethylenediamine.

After removing the inorganic products and evaporating the solvent, 46.5 g of polytriazine product are obtained: yield 80% of theory.

The efficiency, as stabilisers, of the products prepared according to the present invention is illustrated in the examples which follow, in which some of the products obtained in the preparation examples are employed for the stabilisation of polypropylene fibres and tapes and of low-density and high-density polyethylene film.

EXAMPLE 24

2.5 g of the compound indicated in Table III, 0.5 g of pentaerythritol tetrakis-3-(3,5-di-t-butyl-4-hydroxyphenyl)-propionate (antioxidant) and 1 g of calcium stearate are intimately mixed with 1 000 g of polypropylene of melt index 13 (Propathene HF 100200, a product of Imperial Chemical Industries).

The mixture is then extruded at a temperature of 200°–230° C. and is converted to granules, from which fibres are obtained by melt-spinning under the following working conditions:

| | |
|---|---|
| temperature of the extruder | 230–250° C. |
| temperature of spinneret | 240° C. |
| stretch ratio | 1:3 |
| multifilament count | 20 denier per filament. |

The fibres obtained are then immersed for 10 hours in an aqueous solution containing 0.5% of a commercial detergent Dixan ® (a product of Henkel Italy) kept stirred at 80° C., rinsed with distilled water, dried and exposed on white cardboard in a Weather-Ometer 65 WR (ASTM G 27-70), with a black panel temperature of 63° C. Samples are taken out periodically and the residual tensile strength of these is measured by means of a tensometer, at a constant speed; the exposure time required to halve the initial tensile strength ($T_{50}$) is then evaluated.

Table III shows the results obtained.

TABLE III

| Stabiliser | $T_{50}$ (hours) |
|---|---|
| Compound of Example 1 | 950 |
| Compound of Example 2 | 970 |
| Compound of Example 4 | 1 050 |
| Compound of Example 6 | 920 |
| Compound of Example 7 | 900 |
| Compound of Example 9 | 880 |
| Compound of Example 11 | 860 |

EXAMPLE 25

In each case, 2 g of one of the compounds indicated in Table IV and 0.3 g of octadecyl 3-(3,5-di-t-butyl-4-hydroxyphenyl)propionate (antioxidant) are intimately mixed with 1 000 g of low-density polyethylene of melt index 0.6 (Fertene EF 3-2000 ®, a product of Società Montedison).

The mixture is then extruded at 190° C. and is converted to granules from which sheets of 0.2 mm thickness are obtained by compression moulding at 200° C. and are exposed on white cardboard in a Weather-Ometer 65 WR (ASTM) G 27-70) with a black panel temperature of 63° C.

The time (T 0.2) required to have an increase in the content of carbonyl groups of 0.2% at 5.85 micrometers is determined. By way of comparison, sheets of polymers are prepared, under the same conditions, but without the addition of light stabilisers.

TABLE IV

| Stabiliser | T 0.2 (hours) |
| --- | --- |
| Without light stabiliser | 750 |
| Compound of Example 1 | 4 370 |
| Compound of Example 2 | 4 250 |
| Compound of Example 4 | 4 790 |
| Compound of Example 5 | 4 000 |
| Compound of Example 6 | 4 530 |
| Compound of Example 7 | 4 240 |
| Compound of Example 8 | 4 690 |
| Compound of Example 10 | 4 180 |
| Compound of Example 11 | 3 920 |
| Compound of Example 17 | 4 270 |

EXAMPLE 26

2 g of each of the compounds indicated in Table V and 1 g of pentaerythritol tetrakis-3-(3,5-di-t-butyl-4-hydroxyphenyl)-propionate (antioxidant) are thoroughly mixed with 1 000 g of polypropylene of melt index 3 (Propathene HF 22 ®, a product of Imperial Chemical Industries) and 1 g of calcium stearate.

The mixture obtained is then extruded at 200°-230° C. and converted to granules, from which tapes having a thickness of 40 um and a width of 3 mm are produced. The working conditions are as follows:

| extruder temperature: | 230-240° C. |
| --- | --- |
| head temperature: | 240° C. |
| stretch ratio: | 1:6 |

The tapes obtained are exposed in a Weather-Ometer 65 WR (ASTM G 27-70) with the temperature of the black panel at 63° C. Samples are taken periodically and the residual tensile strength of these is measured by means of a tensometer at constant speed; the exposure time required to halve the initial tensile strength (T$_{50}$) is then evaluated.

The results obtained are recorded in Table V.

TABLE V

| Stabiliser | T$_{50}$ (hours) |
| --- | --- |
| Compound of Example 1 | 1 550 |
| Compound of Example 2 | 1 440 |
| Compound of Example 4 | 1 370 |
| Compound of Example 5 | 1 590 |
| Compound of Example 6 | 1 480 |
| Compound of Example 7 | 1 280 |
| Compound of Example 8 | 1 510 |
| Compound of Example 11 | 1 560 |
| Compound of Example 16 | 1 700 |
| Compound of Example 17 | 1 610 |

EXAMPLE 27

2 g of each of the compounds indicated in Table VI are thoroughly mixed with 1 000 g of high density polyethylene of melt index 0.4 (Hostalen GF 7660 ®, a product of Hoechst AG), 0.3 g of di-n-octadecyl 3-(3,5-di-t-butyl-4-hydroxyphenyl)propionate (antioxidant) and 1 g calcium stearate.

The mixture obtained is then extruded at a temperature of 190° C. and converted to granules from which sheets of thickness 0.2 mm are produced by compression moulding at 200° C. The sheets are exposed in a Weather-Ometer 65 WR with the temperature of black panel at 63° C.

The time (T 0.1) required to have an increase in the content of carbonyl groups of 0.1% at 5.85 μm is determined.

For comparison sheets are prepared under the same conditions, but without addition of a light stabiliser.

The results obtained are recorded in Table VI.

TABLE VI

| Stabiliser | T 0.1 (hours) |
| --- | --- |
| Without light stabiliser | 350 |
| Compound of Example 1 | 5 170 |
| Compound of Example 2 | 4 930 |
| Compound of Example 4 | 5 540 |
| Compound of Example 5 | 5 250 |
| Compound of Example 6 | 4 710 |
| Compound of Example 7 | 5 540 |
| Compound of Example 9 | 4 020 |
| Compound of Example 11 | 5 500 |
| Compound of Example 14 | 3 600 |
| Compound of Example 17 | 5 210 |

What is claimed is:

1. A compound of the formula

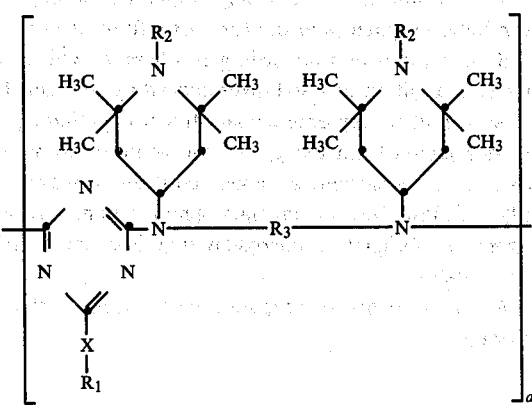

in which $R_1$ is selected from the group consisting of 2,2,6,6-tetramethylpiperid-4-yl and 1,2,2,6,6-pentamethyl-piperid-4-yl, X is >N—$R_9$ in which $R_9$ is hydrogen or $C_1$-$C_8$-alkyl, $R_2$ is hydrogen or methyl, $R_3$ and $R_6$, which may be identical or different, are $C_2$-$C_6$-alkylene, 1,3-cyclohexylenedimethylene or m-xylylene, $R_5$ and $R_7$, which may be identical or different, are selected from the group consisting of hydrogen, n-butyl or cyclohexyl, or together with $R_6$, form a piperazine ring, A is an end group and is chlorine or a radical of the formulae IV or V

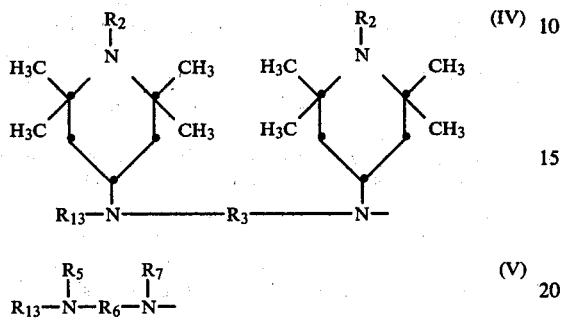

wherein $R_{13}$ is hydrogen or methyl, and $R_2$, $R_3$, $R_5$, $R_6$ and $R_7$ are as defined above; B is hydrogen or methyl, a and b are in the molar ratio of 1:1 and the number average molecular weight Mn is between 2,000 and 10,000.

2. A light-stabilised, heat-stabilised and oxidation-stabilised polymer composition which consists of a synthetic polymer and one or more stabiliser compounds as defined in claim 1, in an amount of between 0.01 and 5% by weight relative to the weight of the synthetic polymer.

3. A composition according to claim 2, wherein the synthetic polymer is polyethylene or polypropylene.

4. A composition according to claim 2, wherein the synthetic polymer is in the form of a fibre or film.

5. A composition according to claim 2, which contains, in addition to a stabilizer according to claim 1, at least one other conventional additive for synthetic polymers selected from the group consisting of an antioxidant, a UV-absorber, a nickel stabilizer, a pigment, a filler, a plasticizer, an antistatic agent, a flame proofing agent, a lubricant, a corrosion inhibitor and a metal deactivator.

6. A process for the preparation of a compound of the formula

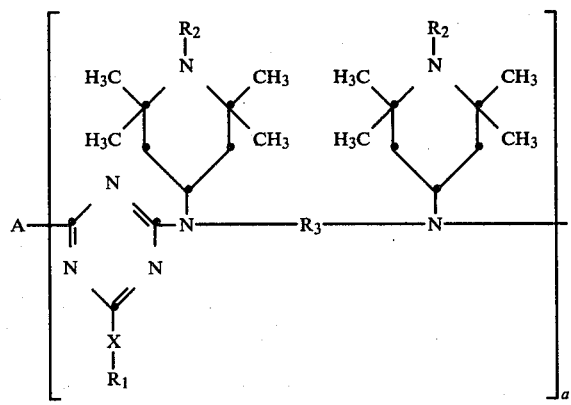

-continued

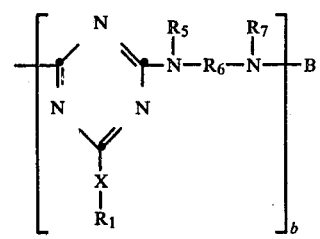

in which $R_1$ is selected from the group consisting of 2,2,6,6-tetramethylpiperid-4-yl and 1,2,2,6,6-pentamethyl-piperid-4-yl, X is >N—$R_9$ in which $R_9$ is hydrogen or $C_1$–$C_8$-alkyl, $R_2$ is hydrogen or methyl, $R_3$ and $R_6$, which may be identical or different, are $C_2$–$C_6$-alkylene, 1,3-cyclohexylenedimethylene or m-xylylene, $R_5$ and $R_7$, which may be identical or different, are selected from the group consisting of hydrogen, n-butyl or cyclohexyl, or together with $R_6$, form a piperazine ring, A is an end group and is chlorine or a radical of the formulae IV or V

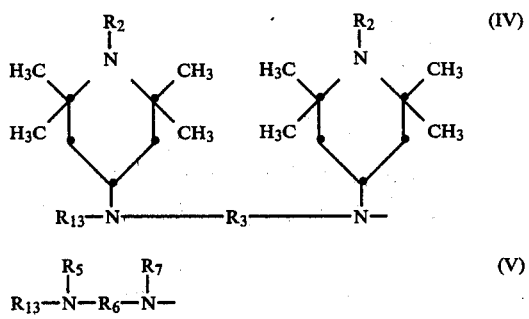

wherein $R_{13}$ is hydrogen or methyl, and $R_2$, $R_3$, $R_5$, $R_6$ and $R_7$ are as defined above; B is hydrogen or methyl, a and b are in the molar ratio of 1:1 and the number average molecular weight Mn is between 2,000 and 10,000 which comprises reacting a dichlorotriazine of the formula VI

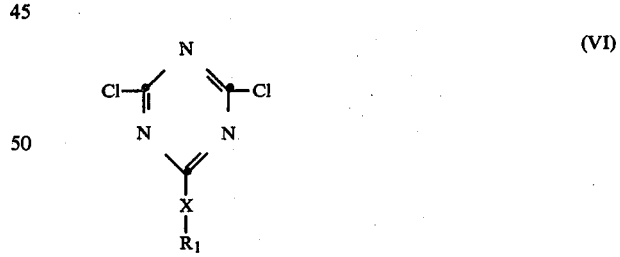

wherein $R_1$ and X are as defined above, first with one of the diamines of the formula (VIII) and (IX)

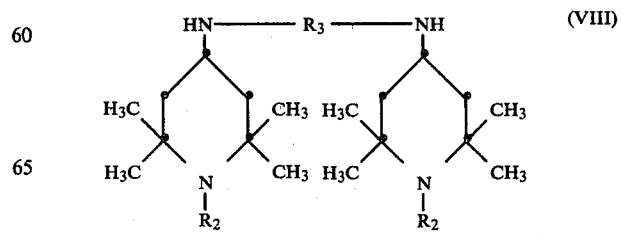

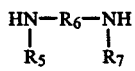

in which $R_2$, $R_3$, $R_5$, $R_6$ and $R_7$ are as defined above, in the molar ratio of 2:1, and reacting the intermediate thus obtained with the second amine of the formula (VIII) or (IX) in an inert organic solvent, in the presence of an organic or inorganic base, at a temperature of between 40° and 200° C. and, in the case where $R_{13}$ is methyl, further methylating the obtained product by heating it under reflux with an excess of formic acid and formaldehyde.

7. A process according to claim 6, wherein the inert organic solvent is selected from the group comprising toluene, xylene and ethylbenzene and the base is sodium hydroxide or potassium hydroxide.

8. A process according to claim 6, wherein the dichlorotriazine (VI) is reacted simultaneously with the diamines (VIII) and (IX).

* * * * *

UNITED STATES PATENT AND TRADEMARK OFFICE
CERTIFICATE OF CORRECTION

PATENT NO. : 4,459,395
DATED : July 10, 1984
INVENTOR(S) : GIUSEPPE CANTATORE

It is certified that error appears in the above-identified patent and that said Letters Patent is hereby corrected as shown below:

Column 12, line 29, change "(Propathene HF 100200" to read --(Propathene HF 100 ® --.

Signed and Sealed this

Twenty-fifth Day of June 1985

[SEAL]

Attest:

DONALD J. QUIGG

Attesting Officer     Acting Commissioner of Patents and Trademarks